(12) United States Patent
Fiedler et al.

(10) Patent No.: US 7,672,828 B2
(45) Date of Patent: Mar. 2, 2010

(54) MEMORY ACCESS TO VIRTUAL TARGET DEVICE

(75) Inventors: Michael Fiedler, Dresden (DE); Ralf Findeisen, Dresden (DE); Michael Grell, Dresden (DE); Matthias Lenk, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1105 days.

(21) Appl. No.: 11/315,977

(22) Filed: Dec. 21, 2005

(65) Prior Publication Data

US 2007/0067151 A1    Mar. 22, 2007

(30) Foreign Application Priority Data

Aug. 31, 2005  (DE)  ............... 10 2005 041 312

(51) Int. Cl.
*G06F 9/44* (2006.01)
(52) U.S. Cl. ................ 703/20; 703/21; 703/25; 703/27; 717/127; 717/135; 711/6
(58) Field of Classification Search ............ 703/13, 703/14, 20, 21, 23–27; 717/100, 106, 107, 717/120, 121, 124, 127, 135; 710/3, 4, 8, 710/9; 711/1, 2, 6
See application file for complete search history.

(56) References Cited

U.S. PATENT DOCUMENTS

| | | | |
|---|---|---|---|
| 7,036,106 B1* | 4/2006 | Wang et al. | 716/18 |
| 7,437,700 B2* | 10/2008 | Wang et al. | 716/18 |
| 2005/0071812 A1 | 3/2005 | Ramkumar et al. | |
| 2006/0015678 A1* | 1/2006 | Wang et al. | 711/104 |

OTHER PUBLICATIONS

Translation of Official Communication in application No. DE 10 2005 041 312.9-53 issued Dec. 6, 2007.
English translation of Official Communication for application No. 10 2005 04 312.9-53, mailed May 12, 2006.
Translation of Decision issued by the German Patent and Trademark Office in application No. DE 10 2005 041 312.9-53 issued Jul. 11, 2008.
Decision (in German) issued by the German Patent and Trademark Office in application No. DE 10 2005 041 312.9-53 issued Jul. 11, 2008.

* cited by examiner

*Primary Examiner*—Russell Frejd
(74) *Attorney, Agent, or Firm*—Meyertons, Hood, Kivlin, Kowert & Goetzel, P.C.

(57) ABSTRACT

A software development technique is provided using target system virtualization software simulating behaviour of a target system. A target device driver running on a host system issues memory access commands to the target system virtualization software rather than to a memory interface unit of the host system. The memory interface unit may be an SRAM (Static Random Access Memory) interface. The target system may be an EGPRS (Enhanced General Packet Radio Service) modem.

18 Claims, 6 Drawing Sheets

MEMORY ACCESS TO VIRTUAL TARGET DEVICE

BACKGROUND OF THE INVENTION

1. Field of the Invention

The invention generally relates to software development, and more particularly to developing and testing device drivers for target systems that may be used in a host system.

2. Description of the Related Art

Host systems like personal computers, notebooks, palmtops or the like sometimes have target systems embedded. Such embedded target devices may be integrated circuit chips, chip sets, processors or printed circuit boards or other kinds of hardware units. The target systems add functionality to the host system that would not be available to the host system without having embedded the target device.

To have embedded target systems operating properly, the host system may require dedicated driver software running on the host system. This device driver outputs data to, and receives data from, the embedded target in a specific format, complying with certain protocols.

Such target device drivers need to be developed and tested on the host system to be sure that the host system, having embedded the target system, operates properly. Thus, developing device drivers requires the presence of a target device within the host system.

If a new hardware target device is to be developed, the driver software development and testing is delayed until a target system sample is available to the software developers. Even if an early prototype of the target system is used for software development, there is an uncertainty that the final hardware implementation is changed. That is, situations may arise where new hardware does already exist for instance in a hardware simulation environment but reliably working driver software is not yet available.

SUMMARY OF THE INVENTION

A software development and testing technique is provided which may be of improved reliability and efficiency, in particular where a target system brings out new functionality.

In an embodiment, a computer readable storage medium is provided which stores instructions, that, when executed by a processor of a host system, cause the processor to simulate a memory interface to which a target system can be connected, by a software module implementing a virtual memory interface device. The virtual memory interface device generates a target system register map within a memory of the host system. The target system register map is addressable by the host system if no target system is connected to the memory interface.

According to another embodiment, there is provided a method of testing a target device driver running on a host system to which a target system can be coupled. The target device driver is configured to issue memory read and/or write commands to a memory interface unit of the host system to access the target system when being coupled to the host system. The method comprises, when the target system is not coupled to the host system, running on the host system at least a first part of target system virtualization software simulating behaviour of the target system, and causing the target device driver to issue memory read and/or write commands to the target system virtualization software rather than to the memory interface unit.

Still a further embodiment relates to a software development system which is capable of allowing a user to develop and test an EGPRS (Enhanced General Packet Radio Service) modem device driver even if an EGPRS modem device is not available. The software development system is capable of implementing a virtual EGPRS modem and redirecting memory accesses made by the EGPRS modem device driver to the virtual EGPRS modem. The virtual EGPRS modem is capable of responding to the memory accesses in a manner allowing the EGPRS modem device driver to operate as if the memory accesses were made to an existing EGPRS modem device.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
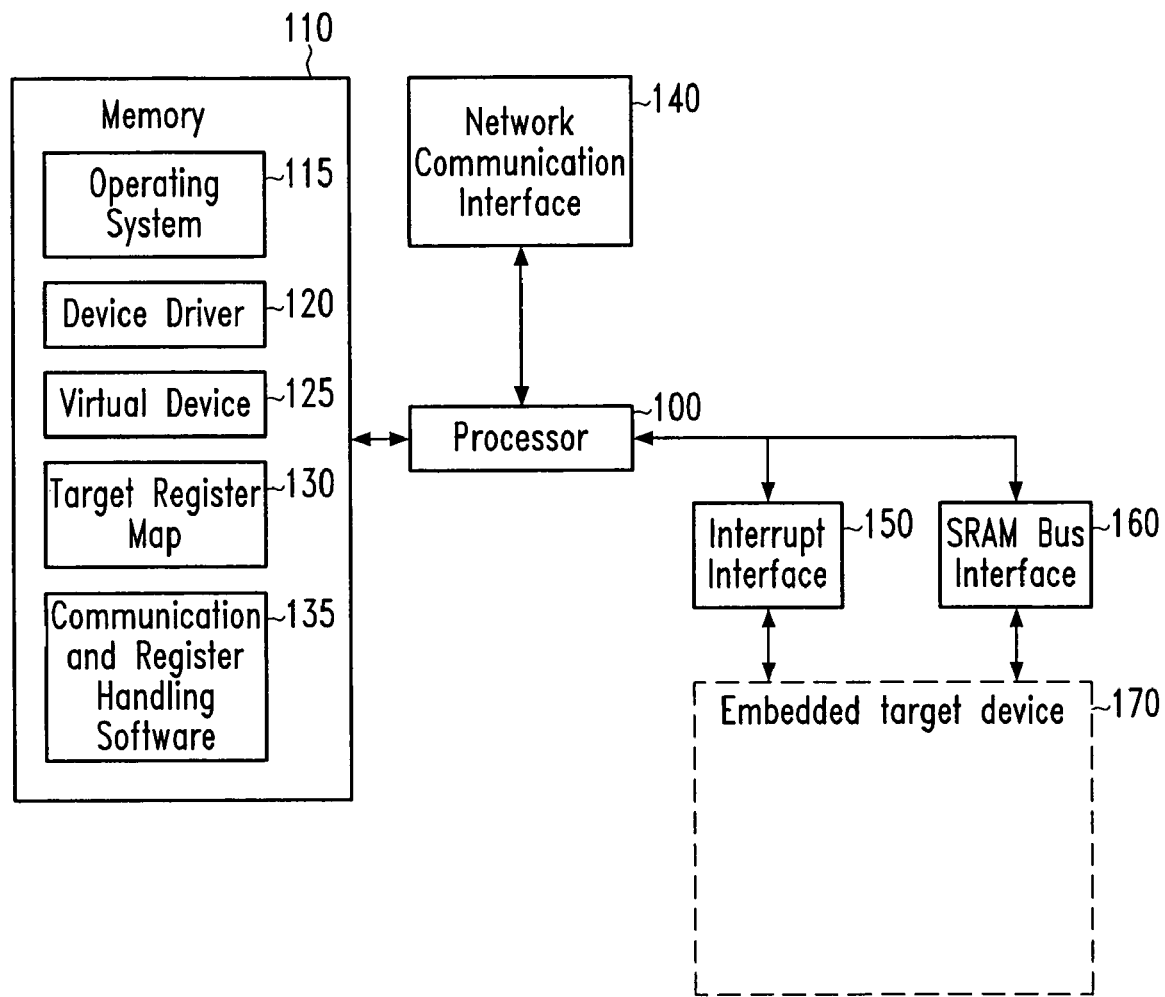
FIG. 1 is a block diagram illustrating components of a host system that can have embedded a target device, according to an embodiment.

Referring first to FIG. 1, a host system which may be used as a software development system, is depicted according to an embodiment. As can be seen from the figure, there is a central processing unit 100 which is connected to a memory 110. The memory of the host system may be a RAM (Random Access Memory) device but may also include EEPROM (Electrically Eraseable Programmable Read Only Memory) or other flash memories, or disk drives.

The memory 110 may include an operating system 115 and other software.

Further, the host system of FIG. 1 has a network communication interface 140 that may allow the host to connect to external devices via a network connection such as Ethernet.

As may be seen from FIG. 1, the host system may have a target device 170 embedded. The target device 170 may be an integrated circuit chip, a chip module having more than one chip, or a printed circuit board or any other hardware unit which can add functionality to the host system. In the present embodiment, the target device 170 is an EGPRS modem device.

The interface of the host system to the embedded target device 170 of the present embodiment is split into an SRAM (Static Random Access Memory) bus interface 170 and an interrupt interface 150. The SRAM bus interface 160 is a host system hardware unit allowing the host system to control the embedded target system by issuing memory access commands to the target system 170 via an SRAM interface bus. The memory access may include register read and/or write commands.

The interrupt interface 150 allows the embedded target device 170 to generate interrupt conditions for the host system. In another embodiment, the interrupt interface 150 may be bidirectional, thereby allowing both the host system and the target system 170 to generate interrupts for the respective other one of the systems.

In order to allow a user of the host system to develop and test the target device driver 120, i.e., a host system software for controlling the target system 170, even in situations where the respective hardware is not available, the embodiment makes use of a virtual device 125. In an embodiment, the virtual device 125 simulates the SRAM bus interface 160 for the device driver 120 instead of the real hardware SRAM bus interface 160. In other words, if there is no target device 170 embedded in the host system, the host system does not use the SRAM bus interface 160 in the software development process, but rather the virtual device 125. The virtual device 125 may therefore be thought of as being a virtual SRAM interface.

When using the virtual device 125 as simulation of the SRAM bus interface 160, the host system generates a target system register map 130 within the host memory 110. If the virtual device 125 is active, all memory accesses by the device driver 120 to the SRAM bus interface 160 are redirected to the target register map 130 which represents the target system registers.

As may be further seen from FIG. 1, the embodiment makes use of a communication and register handling software 135. This software 135 may comprise units 220 and 230 shown in FIG. 2, and has the purpose of feeding the simulated target registers 130 with data from the direction of the simulated target system 240.

Figure 2:
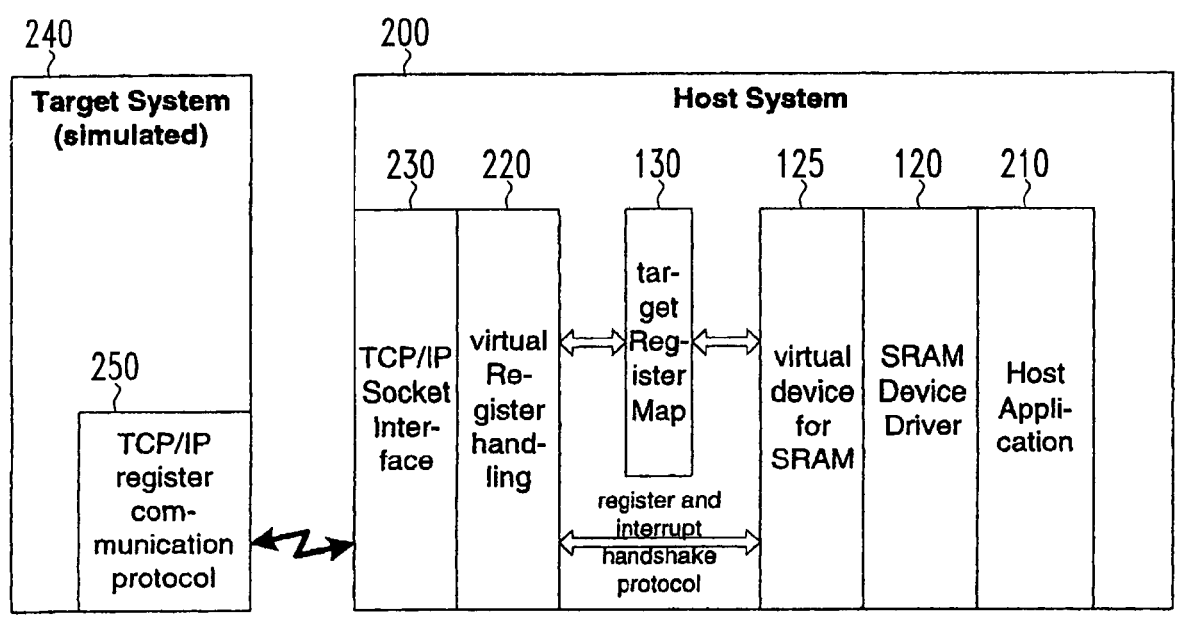
FIG. 2 schematically illustrates software components that may be used according to an embodiment.

Referring to FIG. 2, the target register map 130 is shown within the host system to be connected to both the virtual device 125 and the virtual register handling module 220. The virtual device 125 accesses the target register map 130 so as to give the SRAM device driver 120 the impression to act on an embedded target device 170 via the hardware SRAM bus interface 160. The data within the target register map 130 come, at least in part, from the virtual register handling module 220.

The communication and register handling software 135, 220, 230 may further ensure that the host system is delivered with necessary, suitable or possible interrupt messages or sequences as if interrupts were generated from an embedded target system 170. In the embodiment, the communication and register handling software may further take care of the appropriate interrupt status register update when generating or delivering such interrupts.

As can be seen from FIG. 2, the communication and register handling software may make use of a TCP/IP socket connection to a simulated target system which may have a TCP/IP register communication protocol unit for this purpose. The simulated target system may be embodied completely in software, but may also use hardware components. Further, the simulated target system may be located on an external computer device 240 which is connected to the network communication interface 140 of the host system.

In the event that the virtual SRAM interface of an embodiment does not reach the data throughput which the hardware target would be able to reach based on the SRAM bus interface 160, the virtualization software of the embodiments may be arranged to comply with a register and interrupt handshake protocol to synchronize the host register access to the virtual target registers. The register and interrupt handshake protocol may be based on a system wait queue.

As apparent from the above described embodiments, there is no difference from the host driver software point of view with respect to whether the target register access happens to the virtual or hardware based SRAM device interface regarding the logical target system handling. Thus, host driver development and testing which requires hardware resources like the SRAM bus interfaces for register access on the embedded target solution on simulation base, is made possible even where a target system 170 is not yet available.

It is noted that in the embodiments, the virtualization may be implemented in a manner so as to selectively allow software to activate or deactivate this functionality. That is, the embodiments may allow software to activate the virtual device 125 so that all memory accesses to the SRAM bus interface 160 are redirected to the virtual device 125. In an embodiment, the virtualization is activated whenever the host system detects that no target system 170 is available. Further, the host system may automatically disable a virtual device 125 as soon as an embedded target device 170 becomes available. In another embodiment, the activation or deactivation of the virtual device 125 is made independent from the presence of a target system 170 so that it is then possible to use a virtual device 125 even though a hardware target device 170 is plugged in. This may be useful to validate the proper functioning of the simulated target system 240.

Figure 3:
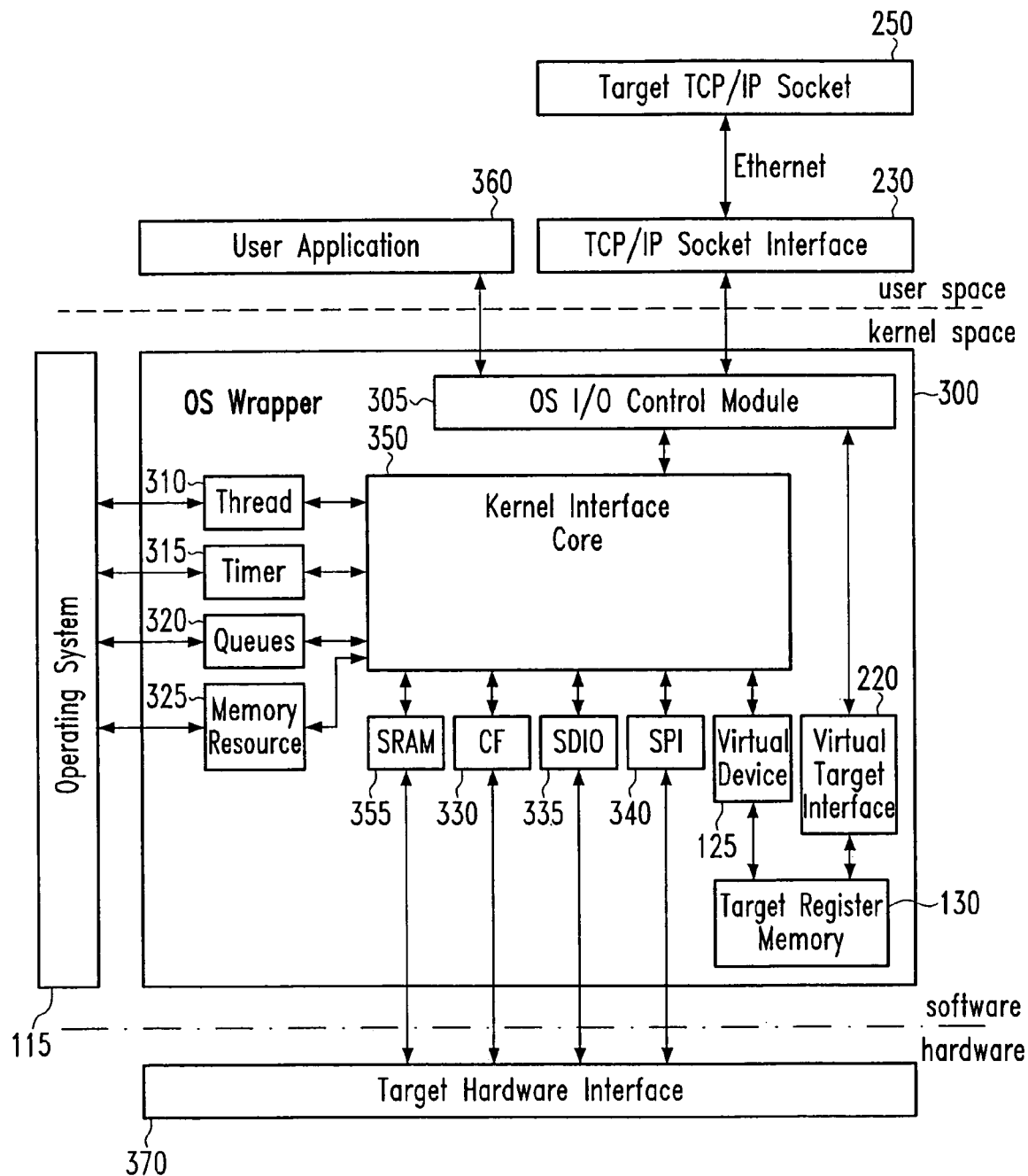
FIG. 3 illustrates an arrangement according to another embodiment, including an intra-modem link socket interface within the host software.

Turning now to FIG. 3, another embodiment is shown. In the software, there is provided an OS (Operating System) wrapper 300 which may have a kernel interface core 350 and a number of software modules enabling the kernel interface core 350 to communicate with an operating system 115. These software modules may include modules 310-325 to deal with threads, timers, queues, and memory resources.

Further, there may be software modules to communicate with the target hardware interface 370. These modules may include an SRAM module 355, a CF (Compact Flash) interface, an SDIO (Secure Digital Input Output) module 335, and an SPI (Serial Peripheral Interface) module 340.

FIG. 3 further shows that in this embodiment, the OS wrapper 300 has incorporated a virtual device 125, a target register memory 130 and a virtual target interface 220 which may work substantially as the corresponding modules discussed with respect to FIG. 2. That is, the virtual target interface 220 provides a virtual intra-modem link interface that may be used for communication and register handling as described above.

In the present embodiment, an intra-modem link socket interface protocol is used to map the intra-modem link register set 130 on the modem via a TCP/IP connection in a transparent way. An appropriate protocol implementation may be used to reduce the implementation effort by basing the intra-modem link socket interface protocol on an UART (Universal Asynchronous Receiver Transmitter) interface.

In the embodiment, data is transmitted over the links using a simple handshaking protocol. A transmission may be composed from the following fields: a transmission index field, a payload length field, a transmission type field, and a payload field. The handshake may then be implemented using the transmission type field. This field may contain information if the transmission was a command or a response to a command. Commands may be indexed using the transmission index field so that a response can be matched to a command.

In an embodiment, the target system virtualization software which may include all of the units 125, 130, 220 to 250 discussed above, may implement an intra-modem link interface tunnel between the application processor, i.e., the application processing modules within the host system, and the target system 170 which may be an EGPRS modem device. This interface tunnel may make use of a CONFIG command that may indicate one of several operating modes with respect to modules 355, 330, 335 and 340, and that may also contain an interrupt enable bit. The CONFIG command may also be used as an initial message from the target to the host to indicate that the host is running. The CONFIG command may deliver the current hardware interface configuration in the payload field.

There may be further READ and WRITE commands to request to read or write a register.

Further, there may be DEVICE_RESET and CONNECTION_RESET commands which do not contain data but may cause assertion of the device reset pin, and reset the connection.

An INTERRUPT_POLL command may cause an interrupt message to be sent. This command does not contain data.

Further, there may be optional RAW_DATA and RAW_DATA_POLL commands to forward raw data or request to read data.

Figure 4:
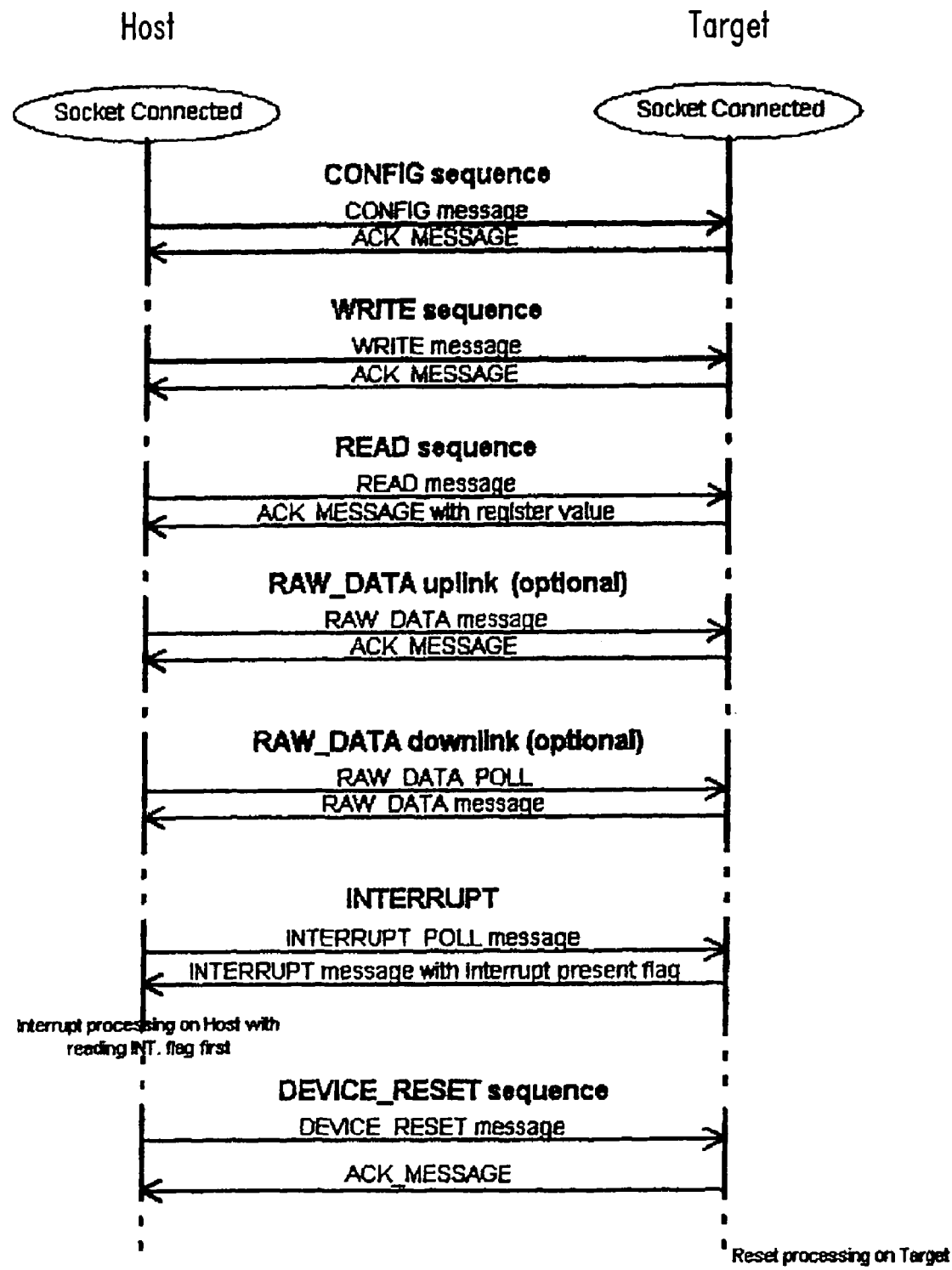
FIG. 4 illustrates interface protocol sequences that may be used in the embodiments.

Any of the above commands may be acknowledged by a MESSAGE_ACK response with a transported message identifier. FIG. 4 is a sequence diagram illustrating the above described socket interface protocol sequences according to an embodiment.

Figure 5:
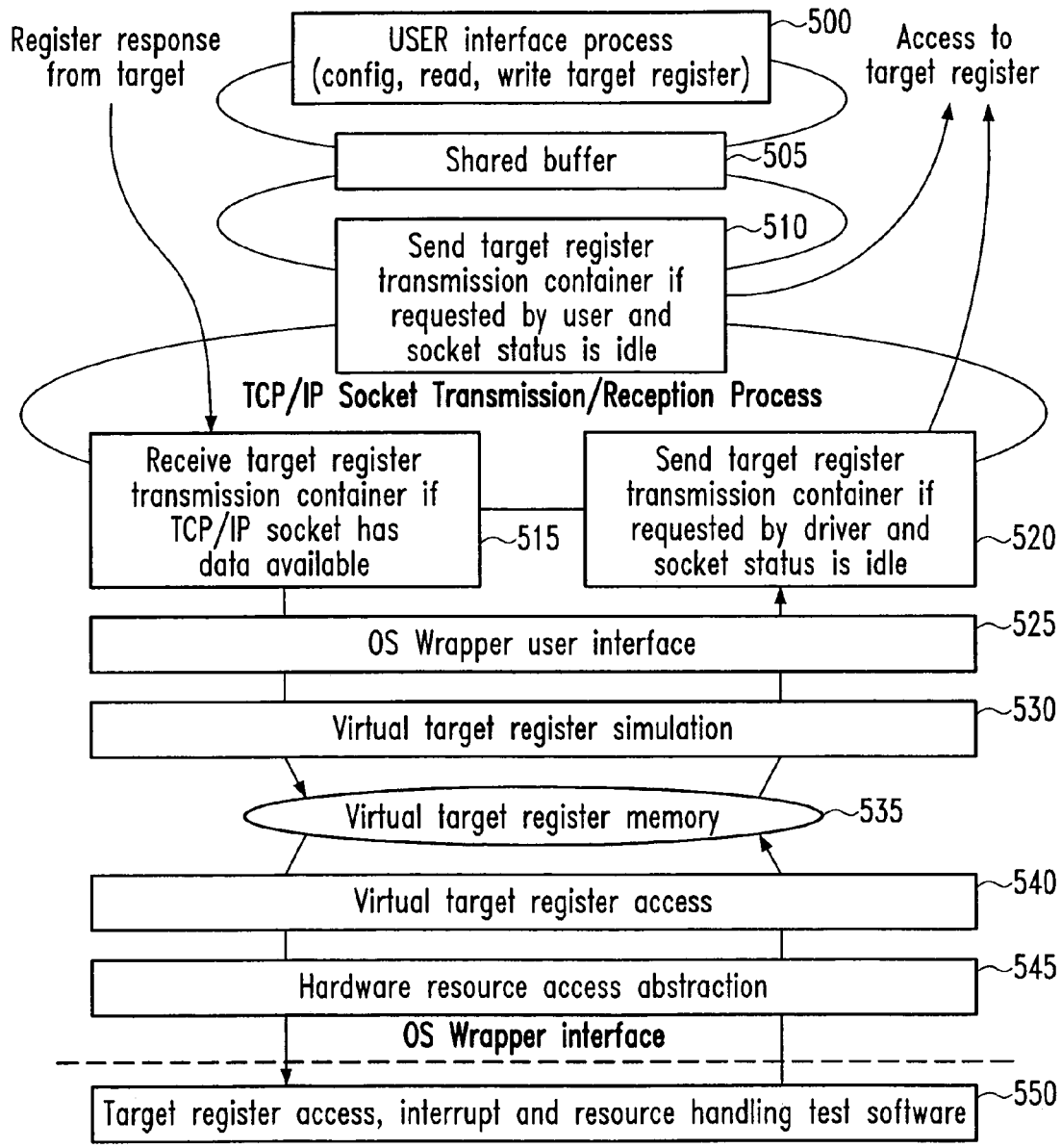
FIG. 5 is a flow chart illustrating the intra-modem link socket software interaction in the embodiment of FIG. 3.

Turning now to FIG. 5, the software structure of the intra-modem link socket is shown to illustrate the software interaction between the OS wrapper and the host socket application.

In FIG. 5, the TCP/IP socket transmission/reception process according to an embodiment is shown to have steps 510 of sending a target register transmission container if requested by a user and if the socket status is idle, step 515 of receiving a target register transmission container if the TCP/IP socket has data available, and step 520 of sending a target register transmission container if requested by the driver and if the socket status is idle. The user interface process 500 is mainly intended for initiating test messages composed by hand for development purposes. Step 510 may share a buffer 505 with a user interface process 500 which may include target register configuration, read and write processes. Step 515 may be entered if an intra-modem link register response is received from the target via the TCP/IP socket. Steps 510 and 520 may lead to intra-modem link register accesses to the target via the TCP/IP socket.

If a response is received from the target in step 515, the data enters the OS I/O control module 305 of the OS wrapper 300 in step 525, the virtual target interface 220 in step 530 and the target register memory 130 in block 535. Based on this data, the virtual device 125 accesses the register 130 in step 540 and submits the data to a hardware abstraction layer of the kernel interface core 350 in step 545. The process then continues with step 550 of performing the target register access, interrupt and resource handling test software.

In the other direction, the test software may initiate a register access in step 550, and steps 545, 540, 535, 530 and 525 are then performed in reversed order. Step 520 finally sends the target register transmission container so as to perform an intra-modem link register access to the target via the TCP/IP socket.

Figure 6:
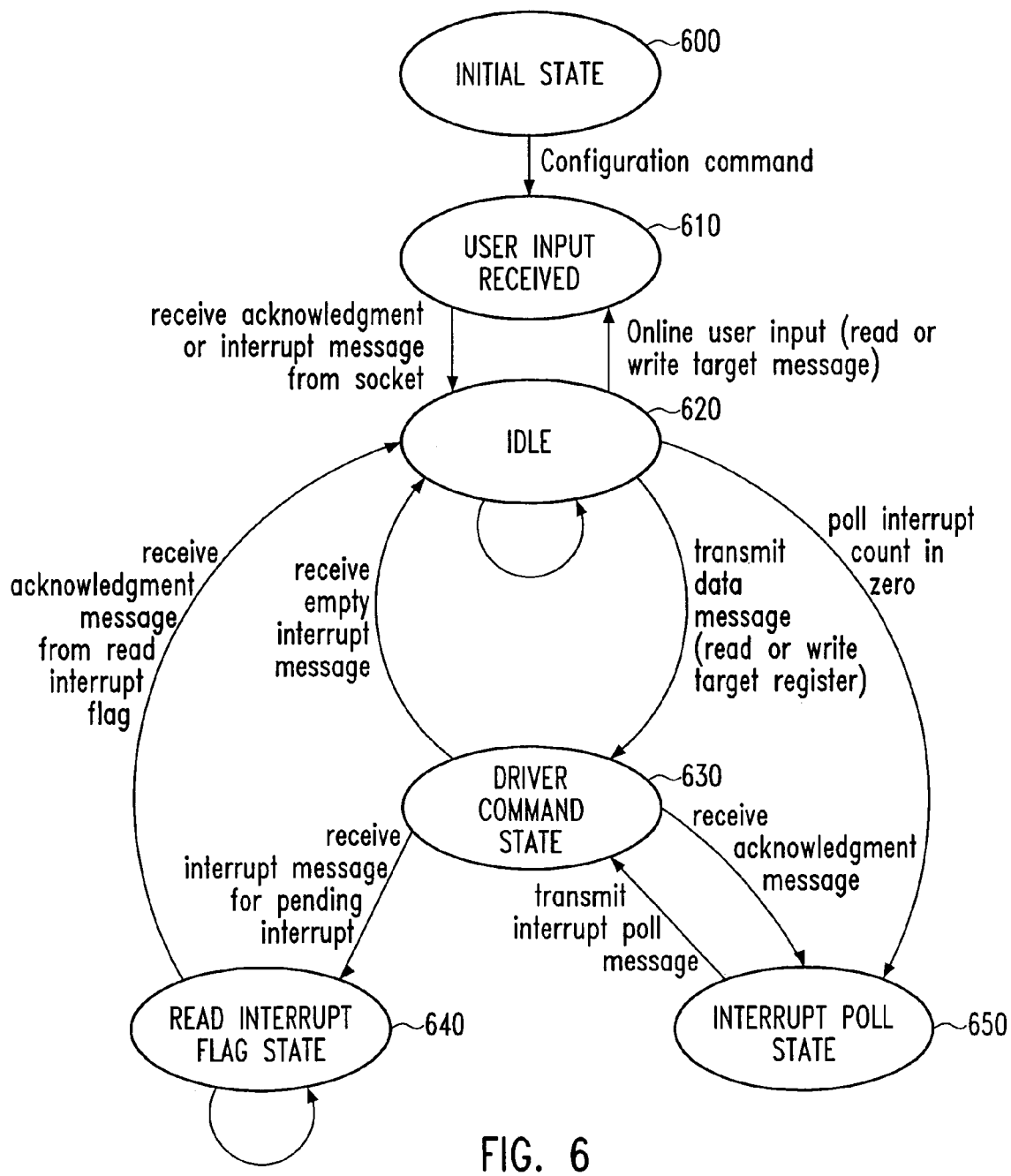
FIG. 6 is a state diagram giving an overview on the host socket state interactions that may occur in the embodiments.

Turning now to FIG. 6, a state diagram is depicted according to an embodiment. The INITIAL STATE 600 is the state which is entered after system start. State 610 is the state which is entered after a user input. As shown in FIG. 6, the transition from state 600 to state 610 may also occur if a CONFIG command occurs.

Step 620 is entered whenever the system is idle. That is, the system is in this state if all outstanding response and acknowledgment messages were received.

The DRIVER COMMAND STATE 630 is the state entered if the driver has sent a command message to the target socket, e.g., a read, write or configuration message.

The INTERRUPT POLL STATE 650 is the state entered if an interrupt poll message has to be sent. Finally, the READ INTERRUPT FLAG STATE 640 is entered after receiving an interrupt pending message for reading the interrupt flag.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

For instance, while the above embodiments have been described in the context of an SRAM interface, other embodiments may relate to other memory mapped interfaces such as CF, SD (Secure Digital) Card, MMC (MultiMedia Card), SPI, or the like.

In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A computer readable storage medium storing instructions that, when executed by a computing device, cause the computing device to simulate a memory interface to which a target system can be connected, by a software module implementing a virtual memory interface device, said virtual memory interface device generating a target system register map within a memory of the computing device, said target system register map being addressable by the computing device if no target system is connected to said memory interface;

wherein the computer readable medium stores further instructions that, when executed by the computing device, activate or deactivate said virtual memory interface device, wherein memory access requests generated by the computing device are directed to said memory interface if said instructions to deactivate said virtual memory interface device are executed, and wherein said memory access requests are redirected to said target system register map if said instructions to activate said virtual memory interface device are executed.

2. The computer readable storage medium of claim 1, wherein said virtual memory interface device is activated if no target system is connected to said memory interface.

3. The computer readable storage medium of claim 1, wherein said memory interface is an SRAM (Static Random Access Memory) interface.

4. A method of testing a target device driver running on a computing device configured to be coupled to a target system, said target device driver being configured to issue memory read and/or write commands to a memory interface unit of said computing device to access said target system when being coupled to said computing device, the method comprising, when said target system is not coupled to said computing device:

running on said computing device at least a first part of target system virtualization software simulating behavior of said target system; and causing said target device driver to issue memory read and/or write commands to said target system virtualization software rather than to said memory interface unit;

wherein said target system virtualization software is configured to generate a set of target system registers within a memory of the said computing device, wherein said memory read and/or write commands issued to said target system virtualization software are redirected to access said set of target system registers.

5. The method of claim 4, further comprising:
running on said computing device register handling software configured to store data into said set of target system registers, said data being suitable for being accepted by said computing device as register data of said target system.

6. The method of claim 5, wherein said target system virtualization software and said register handling software are configured to comply with a handshake protocol to be synchronized to memory accesses to said set of target system registers by said computing device.

7. The method of claim 5, wherein said register handling software comprises a TCP/TP socket interface used to provide said data.

8. The method of claim 5, further comprising:
running on said computing device communication software configured to generate interrupts and deliver them to said computing device, said interrupts being suitable for being accepted by said computing device as interrupts of said target system.

9. The method of claim 4, further comprising:
running on said computing device communication software configured to generate interrupts and deliver them to said computing device, said interrupts being suitable for being accepted by said computing device as interrupts of said target system, wherein said communication software comprises a TCP/IP socket interface used to generate said interrupts.

10. The method of claim 4, further comprising:
running on said computing device communication software configured to generate interrupts and deliver them to said computing device, said interrupts being suitable for being accepted by said computing device as interrupts of said target system, wherein said target system virtualization software and said communication software are configured to comply with a handshake protocol to synchronize said interrupts to said computing device.

11. The method of claim 4, further comprising:
running a second part of said target system virtualization software for simulating behavior of said target system, on a computer system external to said computing device, the external computer system and said computing device being coupled to communicate with each other using a TCP/IP connection.

12. A software development system comprising:
a computing device; and
a memory storing instructions that, when executed by a processor, implement development and testing of an EGPRS (Enhanced General Packet Radio Service) modem device driver even if an EGPRS modem device is not available, wherein said software development system is configured to implement a virtual EGPRS modem and to redirect memory accesses made by said EGPRS modem device driver to said virtual EGPRS modem, wherein said virtual EGPRS modem is configured to respond to said memory accesses in order to allow said EGPRS modem device driver to operate as if the memory accesses were made to an existing EGPRS modem device.

13. The software development system of claim 12, wherein said virtual EGPRS modem is configured to generate a set of target system registers within the memory of the software development system, wherein said software development system is configured to redirect memory accesses made by said EGPRS modem device driver to said virtual EGPRS modem to access said set of target system registers, and wherein the software development system is further configured to run register handling software configured to store data into said set of target system registers, said data being suitable for being accepted as register data of an EGPRS modem device.

14. The software development system of claim 12, wherein said computing device is configured to execute instructions in order to run communication software configured to generate interrupts, said interrupts being suitable for being accepted as interrupts of an EGPRS modem device.

15. The software development system of claim 14, wherein said communication software is configured to cause an update of an interrupt status register when generating or having generated an interrupt.

16. The software development system of claim 14, wherein said communication software comprises a TCP/IP socket interface used to generate said interrupts.

17. The software development system of claim 14, wherein said virtual EGPRS modem and said communication software are configured to comply with a handshake protocol to synchronize said interrupts.

18. The software development system of claim 12, wherein said software development system is configured to communicate with an external EGPRS modem virtualization software suitable for simulating behavior of said EGPRS modem device, said external EGPRS modem virtualization software and said software development system being coupled to communicate with each other using a TCP/IP connection.

* * * * *